US005541998A

United States Patent [19]

Kutner et al.

[11] Patent Number: 5,541,998

[45] Date of Patent: Jul. 30, 1996

[54] HEALTH CLUB AUDIO SYSTEM

[75] Inventors: Lawrence H. Kutner, Niagara Falls; Kazmer Z. Kovacs, Amherst, both of N.Y.

[73] Assignee: LAR Electronics Corp., Niagara Falls, N.Y.

[21] Appl. No.: 326,320

[22] Filed: Oct. 20, 1994

[51] Int. Cl.[6] .......... H04B 3/00

[52] U.S. Cl. .......... 381/77; 381/119; 381/120; 381/55

[58] Field of Search .......... 381/77, 80, 82, 381/98, 101, 102, 107, 108, 119, 122, 55, 120

[56] References Cited

U.S. PATENT DOCUMENTS

| | | | |
|---|---|---|---|
| 3,991,370 | 11/1976 | Pate | 381/55 |
| 4,163,119 | 7/1979 | Baba et al. | 381/55 |
| 4,327,250 | 4/1982 | von Recklinghausen | 381/55 |
| 4,363,001 | 12/1982 | Suzuki et al. | 381/101 |
| 4,688,002 | 8/1987 | Wingate | 381/55 |
| 4,821,329 | 4/1989 | Straub | 381/119 |
| 4,953,218 | 8/1990 | Hughes, Jr. | 381/55 |
| 4,982,435 | 1/1991 | Kato et al. | 381/102 |
| 5,237,619 | 8/1993 | Frassinetti | 381/119 |

*Primary Examiner*—Forester W. Isen
*Attorney, Agent, or Firm*—Howard J. Greenwald

[57] ABSTRACT

An integrated audio system comprising a case and, connected to said case, an integrated audio amplifier, wherein the integrated amplifier audio is comprised of a housing and, disposed within such housing, a microphone input circuit, a tape input line, a signal processor electrically connected said tape input line and the microphone input circuit, and a power amplifier electrically connected to said signal processor.

14 Claims, 8 Drawing Sheets

HEALTH CLUB AUDIO SYSTEM

FIELD OF THE INVENTION

An audio system comprised of an integrated amplifier and speakers which is especially suitable for use in health clubs.

BACKGROUND OF THE INVENTION

As our society becomes more complicated and advanced, our citizens become less technically literate. Jokes are often made about the difficulty the average citizen has in programming his video cassette recorder or in balancing his checkbook, but these jokes are not very amusing to those faced with the trauma of these seemingly daunting tasks.

"High fidelity" audio systems have been available for many years. The better quality "hi-fi" systems generally require the user to purchase several distinct component systems (such as preamplifiers, amplifiers, speakers, tuners, and the like), to configure and wire these components to create a complete, operative system, and then to adjust these multiple components to obtain the optimum sound output.

Consumers continually demand better sound quality from the "high-fidelity" systems available on the marketplace, but they do not appear to be as willing as they were in years past to invest the time in learning how to configure, assemble, and properly operate such systems. What is needed are high-fidelity systems which are of good quality, relatively inexpensive, simple to install, and easy to operate.

The need for such high fidelity systems is especially apparent in "health clubs" where music is often used to motivate the clients to exercise. In a typical health club, many different instructors, and/or clients, may use a particular piece of audio equipment during any one day; and most of such users, however, have no training in how to use the equipment. Consequently, in addition to frequently producing poor sound quality due to improper settings, the components of conventional audio systems used in health clubs often have relatively short service lives.

It is an object of this invention to provide a substantially "idiot proof" high-fidelity system which is of good quality, is relatively inexpensive, is simple to install, and is easy to operate.

It is yet another object of this invention to provide an amplifier which is relatively stable and, nonetheless, produces superior sound quality.

It is yet another object of this invention to provide an audio system in which signal distortion is minimized.

It is yet another object of this invention to provide an audio system which contains multiple safety features.

It is yet another object of this invention to provide an integrated amplifier system which minimizes the production of unwanted noise and hum.

SUMMARY OF THE INVENTION

In accordance with this invention, there is provided an integrated audio amplifier system comprising a housing and, disposed within such housing, a microphone input circuit, a tape input circuit, a multifunctional signal processor electrically connected said tape input circuit and said microphone input circuit, a power amplifier, and a protection circuit.

BRIEF DESCRIPTION OF THE DRAWINGS

The present invention will be more fully understood by reference to the following detailed description thereof, when read in conjunction with the attached drawings, wherein like reference numerals refer to like elements, and wherein.

DESCRIPTION OF THE PREFERRED EMBODIMENTS

Figure 1:
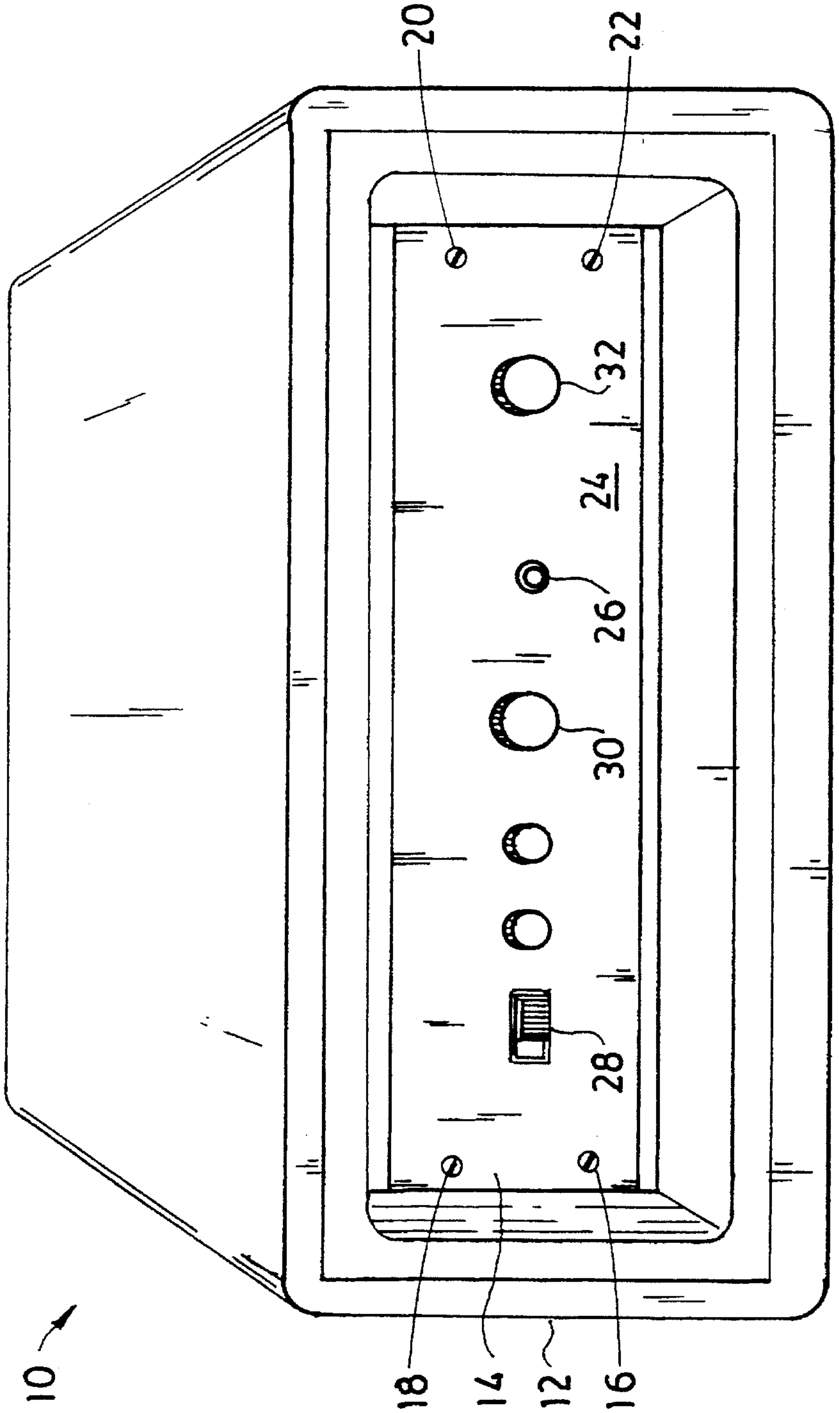
FIG. 1 is a perspective view of one preferred embodiment of the integrated amplifier system of this invention.

FIG. 1 is a perspective view of a preferred integrated amplifier system 10. Referring to FIG. 1, it will be seen that integrated amplifier system 10 is comprised of a enclosure 12 and, disposed therein and attached thereto, amplifier system housing 14. In the preferred embodiment illustrated in FIG. 1, screw fasteners 16, 18, 20, and 22 removably attach amplifier system housing 14 to enclosure 12. Also preferably disposed within enclosure 12, but not shown, is a power cord. Because access to enclosure 12 is limited, users have less of an opportunity to damage the assembly, tamper with it, or improperly connect components to it.

Referring again to FIG. 1, it will be seen that enclosure 12 is preferably an integral structure which can be made from wood, metal, plastic, and the like. It preferably a substantially rigid structure with walls that are at least about 0.3 inches thick and, preferably, or at least about 0.75 inches thick.

In the preferred embodiment illustrated, the control panel 24 of amplifier system housing 14 is comprised of a microphone jack 26, a tape deck jack (not shown) disposed on the back part of the housing 14, an on-off switch 28, a music volume control 30, and a microphone volume control 32. As will be apparent to those skilled in the art, other configurations may be used for the control panel 24.

Figure 1A:
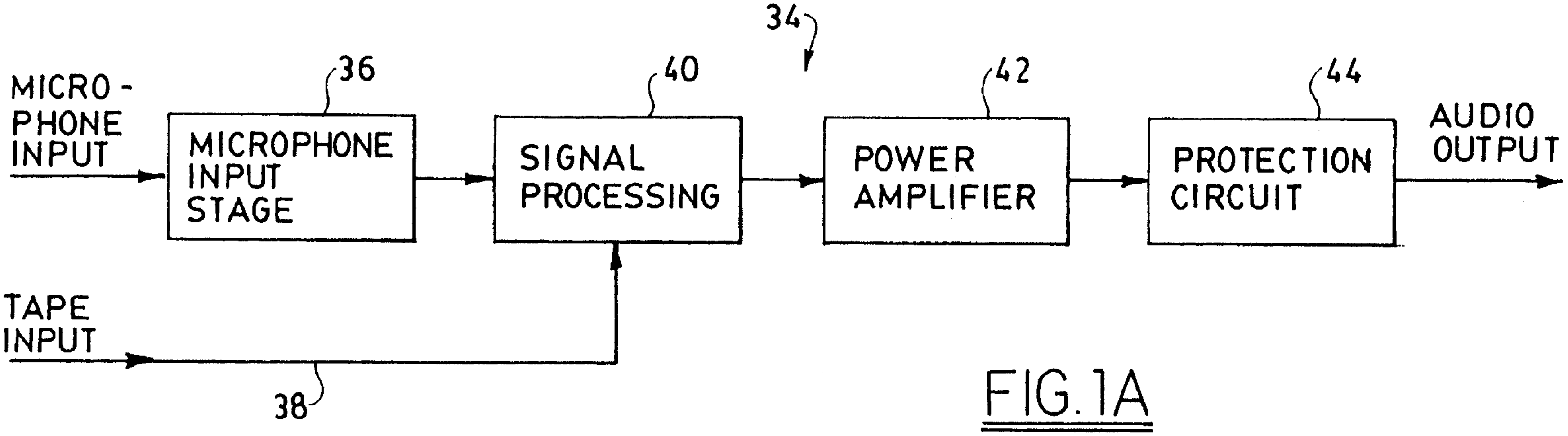
FIG. 1A is a block diagram of the integrated amplifier system of FIG. 1.

FIG. 1A is a block diagram of integrated amplifier 34. Referring to FIG. 1A, it will be seen that integrated amplifier 34 is comprised of a microphone input stage 36, a tape input line 38, a signal processing circuit 40, a power amplifier 42, and a protection circuit 44. Each of these stages, lines, and circuits is discussed in more detail in the remainder of this specification.

Figure 2A:
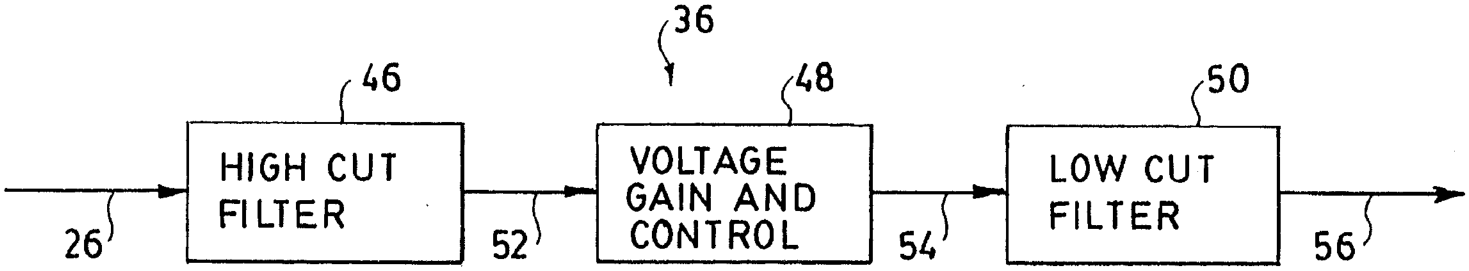
FIG. 2A is a block diagram of one preferred microphone input circuit which may be used in the amplifier of FIG. 1A.

FIG. 2A is a block diagram of one preferred microphone input stage 36 which can be used in the apparatus of this invention. As will be apparent to those skilled in the art, this stage will accommodate a microphone (via microphone input jack 26, e.g.) and allow an aerobics instructor to call out exercises while her charges exercise to the music.

Microphone input stages are well known to those skilled in the art. Thus, by way of illustration and not limitation, suitable microphone input stages which may be used in applicants' device include, e.g., those microphone input stages disclosed in U.S. Pat. Nos. 5,077,801, 4,953,218, 4,928,311, 4,896,360, 4,864,627, and the like. The entire disclosure of each of these United States patents is hereby incorporated by reference into this specification.

FIG. 2A is a block diagram of one preferred microphone input stage 36. Referring to FIG. 2A, it will be seen that, in this preferred embodiment, microphone input stage 36 is comprised of high cut filter 46, voltage gain and control 48, and low cut filter 50.

As will be apparent to those skilled in the art, the function of high cut filter 46 is to remove from the microphone signal fed via line 26 substantially all frequencies which are substantially higher than human voice frequencies. High cut filter circuits are well known to those skilled in the art and are described, e.g. on page 289 (FIG. 33-21) of Rudolf L. Graf's "The Encyclopedia of Electronic Circuits" First Edition, Fourth Printing (Tab Books, Inc., Blue Ridge Summit, Pa., 1985). Thus, in general, the high cut filter removes at least about 95 percent of the frequencies above 8 kilohertz per second.

The filtered input from line 26 is then passed via line 52 to voltage gain and control circuit 48. Voltage gain amplifiers are well known to those skilled in the art and are illustrated, e.g., on page 86 (FIG. 9-3, "electronic balanced input microphone amplifier") of the aforementioned "The Encyclopedia of Electronic Circuits). In general, it is preferred that the signal fed via line 52 have its voltage amplified at least about 40 times and, more preferably, at least about 90 times.

The amplified signal from voltage gain circuit 48 is then fed via line 54 to low cut filter 50, which removes substantially all frequencies which are below the frequency of the human voice such as, e.g., those frequencies produced by background noise or feedback. In general, at least about 95 percent of the frequencies below about 100 cycles per second are removed.

Low cut microphone filters are well known to those skilled in the art. See, e.g., page 296 (FIG. 33-36, "high pass active filter") of the aforementioned Graf book.

Referring again to FIG. 2A, the signal passing through low cut filter 50 is then passed via line 56 to signal processing circuit (not shown in FIG. 2A).

Figure 2B:
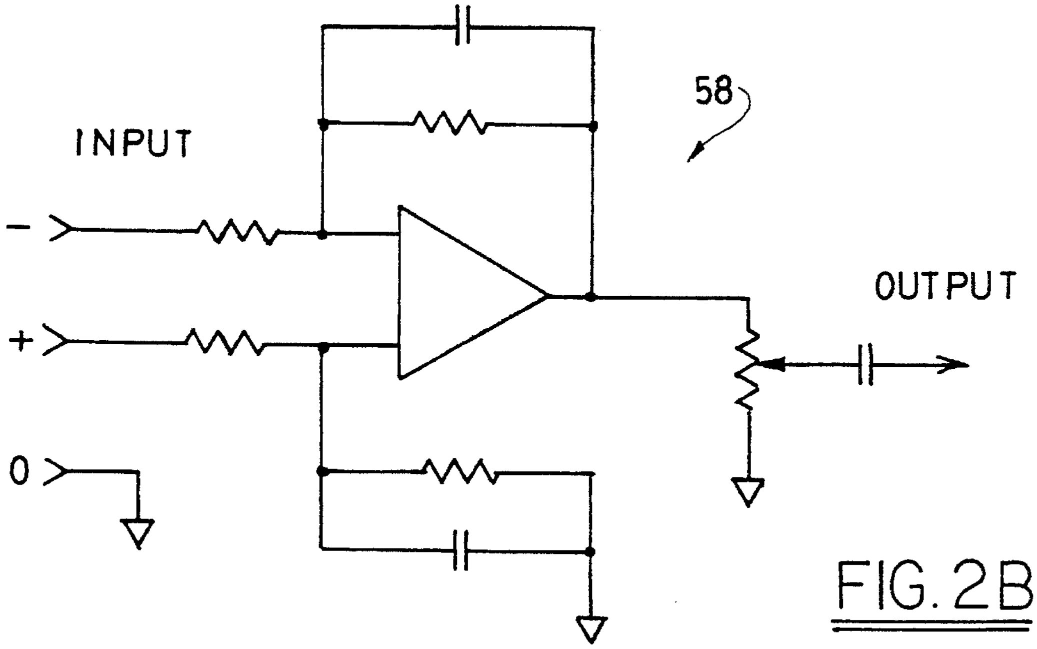
FIG. 2B is a schematic diagram of the microphone input circuit of FIG. 2A.

FIG. 2B is a schematic diagram of a circuit 58 which simultaneously provides all of the functions of the block diagram of FIG. 2A with the use of a few capacitors, resistors, and only one operational amplifier 60.

Figure 3A:
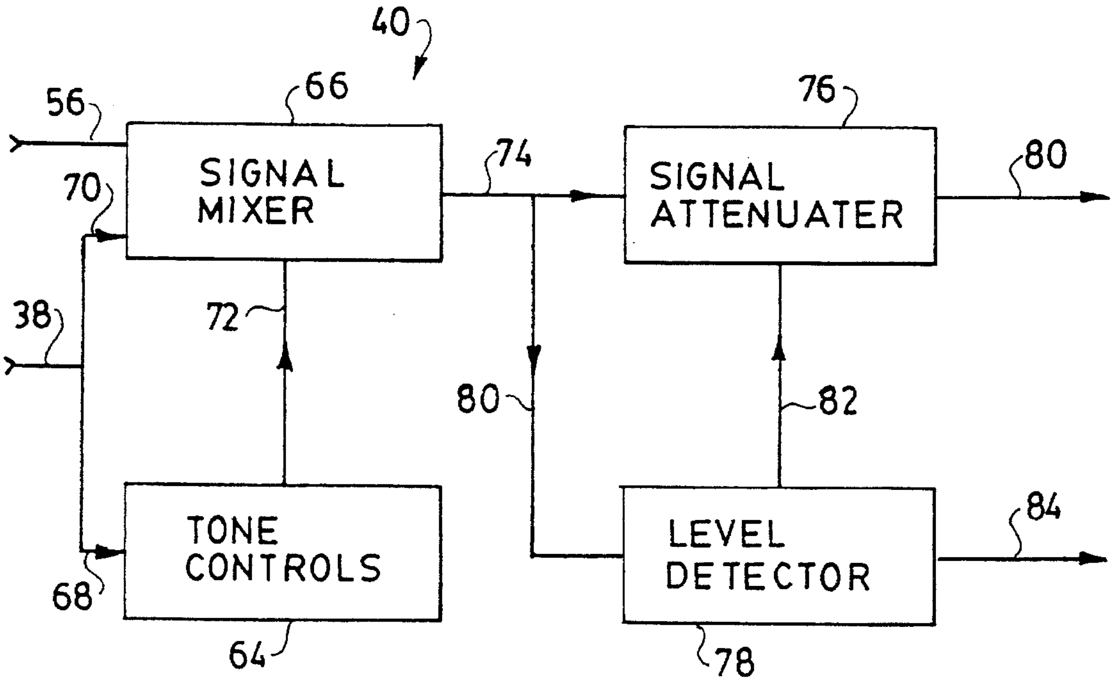
FIG. 3A is a block diagram of one preferred signal processing circuit which may be used in the amplifier of FIG. 1A.

FIG. 3A is a block diagram of a signal processing circuit 40 in which the input from microphone input stage 36 (not shown) and tape input (not shown) is fed via lines 52 and 38, respectively.

Referring to FIG. 3A, the tape input signal fed via line 38 is passed to tone control circuit 64 and signal mixer 66 via lines 68 and 70, respectively. The microphone input signal also is fed (via line 52) to signal mixer 66.

As is known to those skilled in the art, the signal mixer 66 combines the signal from the microphone stage 36 (not shown) and the tape input 38 directly and, additionally, the signal, if any, from tone control circuit 64.

As is known to those skilled in the art, a tone control is a control adapted to permit changing the frequency response so as to secure a proportion of bass to treble that is pleasing to a particular listener. In effect, and in general, a tone control attenuates either low or high audio frequencies a controllable amount to change the overall frequency response. See, e.g., page 394 of Nelson M. Cooke's "Electronics Dictionary" (McGraw-Hill Book Company, Inc., New York, 1945). Also see page 677 (FIG. 89-13, "tone control circuit") of the aforementioned Graf book, which illustrates a series type of tone control circuit.

Referring again to FIG. 3A, it will be seen that tone control circuit 64 is in parallel with signal line 70 so that, the tone control circuit 64 is set at its flat (zero) point, no signal is provided by it to signal mixer 66 and, thus, no modification occurs to the signal. The signal is only modified when one sets the tone control circuit to its "cut" or "boost" mode (for bass and/or treble), in which case a signal is provided via line 72.

In the operation of the tone control circuit 64, if a "cut" is made from the bass and/or treble response desired, then a signal out of phase with the signal of line 70 is presented via line 72 in proportion to the amount of "cut" made. By comparison, if a "boost" is made to the bass and/or treble response desired, then a signal in phase with the signal of line 70 is presented via line 72 in proportion to the amount of "boost" made. As will be apparent to those skilled in the art, when an out-of-phase signal is provided via line 72 to mixer 66, a reduction is signal level is effected, and vice versa.

Thus, in summary, tone control circuit 64 will either add a signal via line 72 (when the tone control is set at the flat point), or an out of phase signal (when the bass or treble response is to be cut), or an in phase signal (when the bass or treble response is to be amplified). As will be apparent to those skilled in the art, a multiplicity of signals may be provided to signal mixer 66 to effect "cutting" or "boosting" various frequencies. Thus, e.g., the tone control circuit may be used in connection with a graphic equalizer (not shown) to cut or boost one or many frequencies present in the signal provided via line 70.

As will also be apparent to those skilled in the art, one advantage of applicants' tone control system is that, when it is set at its flat point for any particular frequency, the signal from line 70 need not be affected by the tone control circuit and, thus, is less likely to contain noise or distortion. By comparison, normal tone control circuits, even when set at their flat point, tend to introduce hiss into a signal.

As will be apparent to those skilled in the art, the function of signal mixer 66 is to the combine the signals from lines 38 and 52 (and, optionally, line 72) into one signal. Conventional signal mixers may be used in applicants' device. Thus, e.g., by way of illustration, one may use the signal mixer disclosed on page 23 (FIG. 2-15, "audio mixer") of the aforementioned Graf book.

The mixed signal from signal mixer 66, which may be modified by the additional of a signal via line 72, is then passed via line 74 to both signal attenuator 76 (via line 74) and to level 78 (via line 80)

The function of signal attenuator 76, and level detector 78, working in combination, is to prevent a signal which is too strong from passing from signal attenuator 76 via line 80. This may be desirable for several reasons.

In the first place, the management of the health club facility may wish to limit the volume produced by the amplifier device and thus preserve the hearing of its patrons and itself. Furthermore, excessive volume may damage audio components such as, e.g. amplifiers, speakers, wires, and other components to which a signal is fed via line 80.

The advantage of the circuit of FIG. 3A is that, when level detector 78 does not detect a volume level in excess of the desired maximum, it does not send any signal via line 82 to signal attenuator 76. In this case, the signal fed via line 74 is not affected by level detector 76 and, thus, picks up no noise or distortion from it.

On the other hand, when the volume level in the signal fed via lines 74 and 80 exceed the threshold amount, level detector 78 detects such condition, evaluates such condition, and sends a signal via line 82 to signal attenuator 76 to decrease the signal in line 74 to an extent necessary to reduce the signal below the threshold amount.

In one embodiment, the threshold volume is pre-set by management so that the users cannot alter such setting and produce obnoxiously loud or dangerous music levels.

In one preferred embodiment, the level detector/signal attenuator circuits combine to produce a response which is relatively fast when the strength of the signal provided via line 74 is extraordinarily strong. This feature is advantageous in preventing sudden damage to an audio system which might occur, e.g., when a user drops a microphone and, thus, sends a dangerously strong signal to the system.

In general, when the signal in line 74 is at least 6 decibels over the threshold value, then within no more than about 100 milliseconds the signal will be attenuated so that the signal passing via line 80 is no more than 3 decibels over the threshold value.

When the signal is over the threshold value, but is less than 3 decibels greater than the threshold value, then the combination of level detector 78 and signal attenuator 76 provides a relatively slow response time. This is done because it is desirable, whenever possible, to avoid sharply attenuating the signal in line 74. Such sharp attenuation produces a signal compression which often is displeasing to listeners. Thus, in order to avoid such sharp attenuation, especially in the case of transient signal spikes, the combination of level detector 78 and signal attenuator 76, when it senses a signal which is less than 3 decibels over the threshold value, will take at least 3.0 seconds to produce a signal which will attenuate the signal in line 74. However, if during this three second interval, the signal in line 74 increases so that it is more than 6 decibels over the threshold amount, the rapid response mode of the system is again activated, and the signal will be attenuated within less than about 100 milliseconds.

Figure 3B:
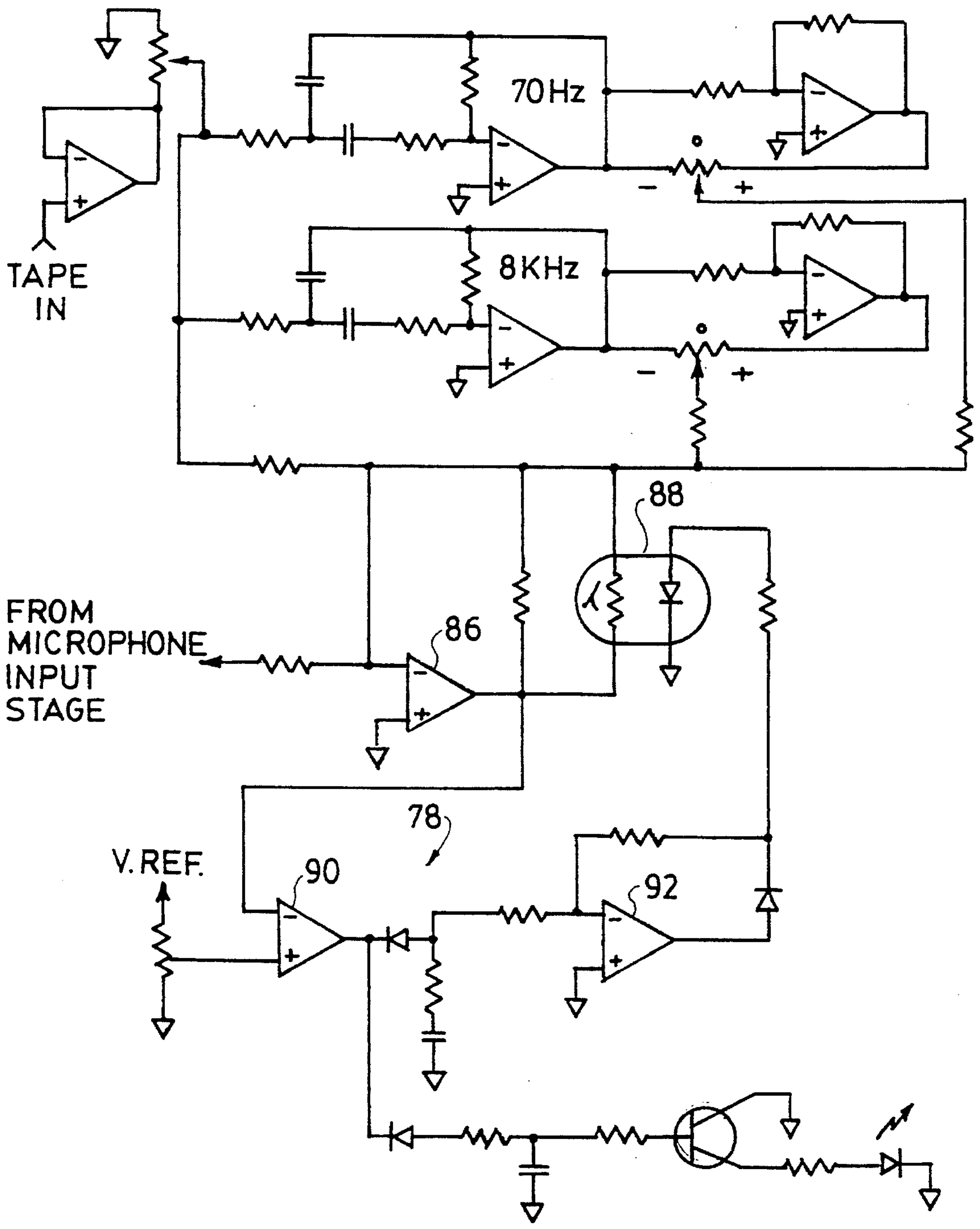
FIG. 3B is a schematic diagram of the signal processing circuit of FIG. 3A.

Referring again to FIG. 3A, the signal from signal attenatuator 76 is passed via line 80 to power amplifier 42 (not shown in FIG. 3A). The signal from level detector 78 is passed via line to a gain reduction indicator lamp (not shown) which may be diposed on control panel 24 and will indicate whenever the volume reduction circuit is in operation, FIG. 3B is a schematic of one preferred means for implementing the block diagram of FIG. 3A. As will be apparent to those skilled in the art, operational amplifier 86 performs at least two functions, acting as both attenuator 76 and signal mixer 66. Opto-coupler 88 is configured as a shunt in the signal path of operational amplifier 86; and, whenenver opto-coupler 88 is not activated by level detector 78 (which is comprised of operational amplifiers 90 and 92), it will have absolutely no effect upon the signal passing through operational amplifier 86.

Figure 4A:
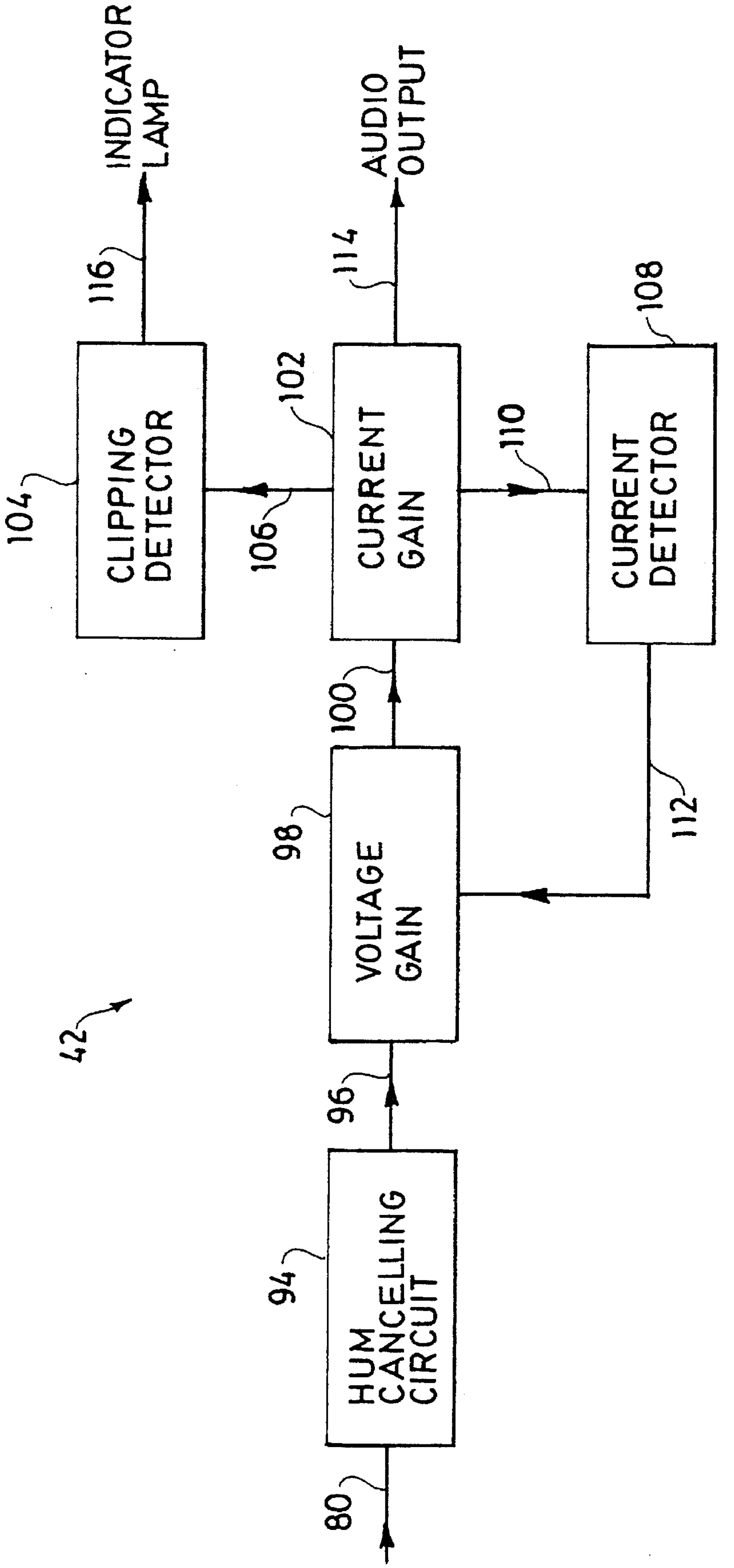
FIG. 4A is a block diagram of a power amplifier which may be used in the integrated amplifier of FIG. 1A.

FIG. 4A is a block diagram of one preferred power amplifier 42 which may be used in applicants' device. Referring to FIG. 4A, the signal from signal attenuator 76 (see FIG. 3A) is passed via line 80 to hum cancelling circuit 94 and thence via line 96 to voltage gain circuit 98. The audio signal from the voltage gain stage is then passed via line 100 to a current gain stage 102 and thereafter simultaneously to a clipping detector circuit 104 (via line 106) and a current detector circuit 108 (via line 110). Feedback from the current detector circuit 108 is provided by line 112 to voltage gain circuit 98.

Referring again to FIG. 4A, the hum cancelling circuit is preferably comprised of a differential amplifier (also sometimes referred to as a long-tailed pair) which has two inputs. The output of a differential amplifier is proportional to the voltage or current difference between the inputs.

As is apparent to those skilled in the art, a differential amplifier, by the mechanism of common mode rejection, provides noise rejection. In such an amplifier, the difference between a pair of inputs (inverting and non-inverting) is amplified. A common-mode signal is one that is applied with the same phase to both inputs of the amplifier, and it should result in a negligible output signal. The common mode rejection ratio, expressed in decibels, is the ratio of the response to a differential signal to the response to a common mode signal when both are applied at equal amplitude. The rejection ratio can be large, on the order of 100 decibels, for some integrated circuits.

Referring again to FIG. 4A, line 80 is preferably comprised of two separate lines, one of which is the inverting input and the other of which is the non-inverting input to hum canceling circuit 94. The signal fed through the inverting line is connected to the ground of signal attenuator 76 (see FIG. 3A), and the signal fed through the non-inverting line is connected the output of signal attenuator 76. As will be apparent to those skilled in the art, the opposite arrangement of lines also is operative.

Referring again to FIG. 3A, when the noninverting signal and the inverting signal are equal in amplitude, substantially no amplification occurs in the hum canceling circuit because of common mode rejection, and the signal is passed substantially undisturbed to voltage gain amplifier 98. This feature eliminates a common problem, known as "ground loop hum," between the signal processor 40 and the power amplifier 42.

The signal from hum canceling circuit 94 is passed via line 96 to voltage gain amplifier, wherein the voltage is increased (if necessary) to the desired full output voltage. In general, an output voltage of about 50 volts peak is desired to be provided to line 100.

The amplified signal in line 100 is then passed to current amplifier 102, wherein the current is increased (if necessary) to the desired full output current. In general, an output amperage of about 4 amperes is desired to be provided to line 114.

The current gain amplifier 102 also feeds its amplified signal to clipping detector 104 and current detector 108.

The current detector 108 evaluates the current level in line 110 and, whenever it exceeds a threshold amount (such as, e.g., 4.0 amperes), sends a signal via line 112 to voltage amplifier 98 and causes the voltage gain in such amplifier to decrease to an extent sufficient to bring the current in line 110 below the threshold amount.

The clipping detector 104 will cause an indicator lamp (not shown, but connected via line 116) to light whenever the voltage in line 106 exceeds a specified threshold voltage (such as, e.g., 50 volts peak). This lamp may be disposed, e.g., on control panel 24 (see FIG. 1).

Figure 4B:
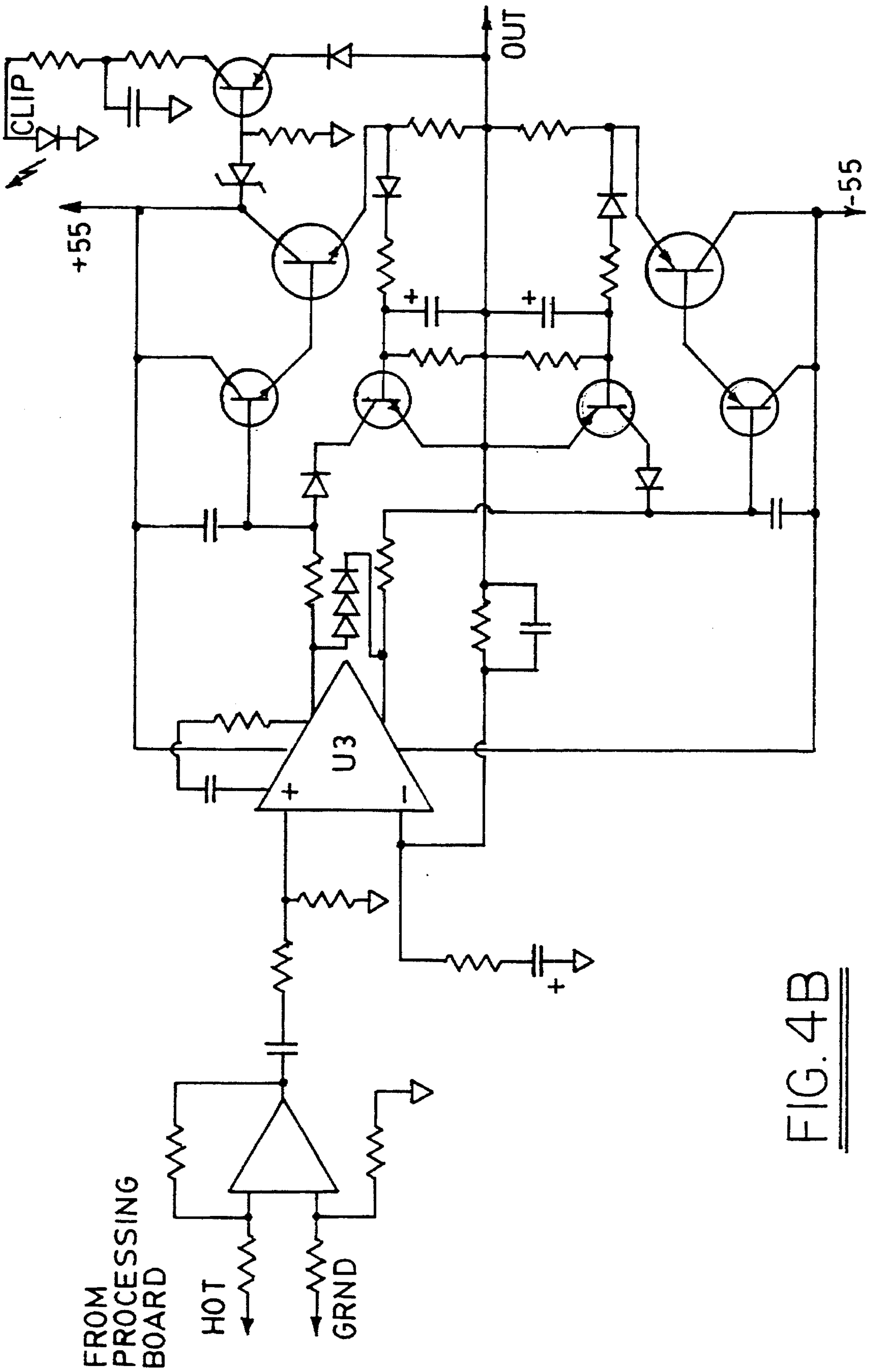
FIG. 4B is a schematic diagram of the power amplifier of FIG. 4A.

FIG. 4B is a schematic of one preferred circuit which can be used to effect the functions depicted in block diagram 4A.

Figure 5A:
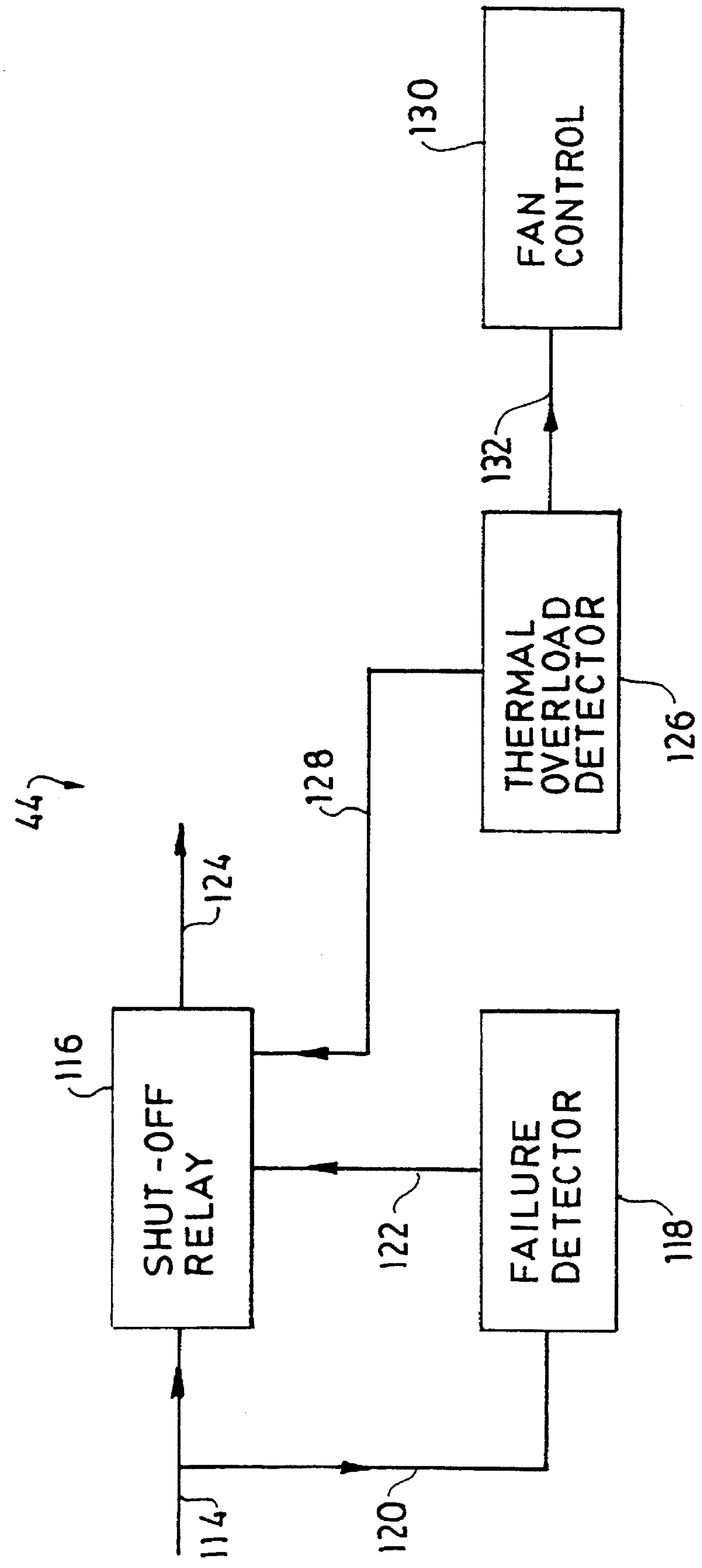
FIG. 5A is a block diagram of a protective circuit which may be used in the integrated amplifier of FIG. 1A.

FIG. 5A is a block diagram of one preferred protective circuit 44 which may be used in applicants' device. Referring to FIG. 5A, it will be seen that the output from power amplifier 42 is fed via line 114 to shut off relay 116 and, simultaneously, to failure detector circuit 118 (via line 120).

As will be apparent to those skilled in the art, the output from power amplifier 42 should be an alternating current. Thus, if failure detector circuit 118 detects a steady direct current with a duration in excess of 200 milliseconds, it will send a signal via line 122 to shut-off relay 116 which, in turn, will cause the relay to open and, thus, will disconnect line 124.

The thermal overload circuit 126, is connected to a heat sink (not shown) which, when reaches a dangerously high temperature, causes overload detector 126 to send a signal to shut off relay 116 vial line 128 and to open such relay. In one embodiment, illustrated in FIG. 5A, it also sends a signal to fan control 130 (via line 132) and causes a fan to start operating. In another embodiment, not shown, the thermal overload detector causes the fan to start operating at one temperature, but only causes the shut off relay to open at a substantially higher temperature.

Figure 5B:
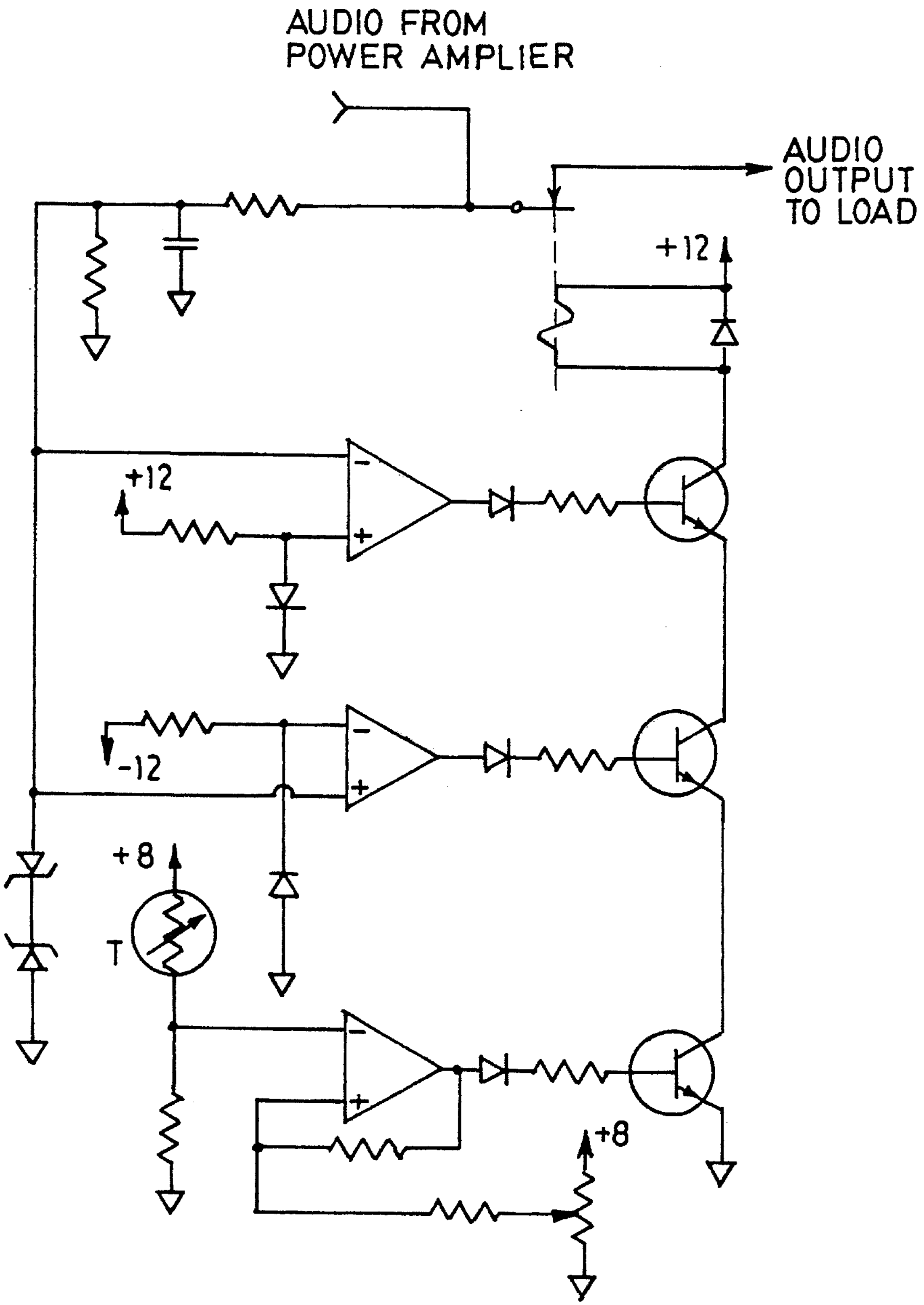
FIG. 5B is a schematic diagram of the protective circuit of FIG. 5A.

FIG. 5B is a schematic of a circuit which may be used to effect the functions of the block diagram of FIG. 5A.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

We claim:

1. An integrated audio system comprising a case and, connected to said case, an integrated audio amplifier, wherein said integrated amplifier audio is comprised of a housing and, disposed within such housing, a microphone input circuit, a tape input line, a signal processor electrically connected said tape input line and said microphone input circuit, and a power amplifier electrically connected to said signal processor, wherein:

(a) said signal processor is comprised of a signal mixer connected to said tape input line and said microphone input circuit, a tone controller connected to said tape input line, wherein said tone controller is comprised of means to selectively provide a signal to said signal mixer and is connected in parallel to said signal mixer;

(b) said signal processor is comprised of a signal attenuator and a level detector, wherein:

1. each of said signal attenuator and said level detector is connected to said signal mixer and is provided with the output of said signal mixer,
2. said level detector is connected in parallel with said signal attenuator is comprised of means for detecting when said output of said signal mixer exceeds a specified amplituide, and
3. said level detector is comprised of means for providing a signal to said signal attenuator when said output of said signal mixer exceeds a specified amplitude and for causing said signal attenuator to reduce the ampltitude of said output of said signal mixer.

2. The integrated audio system as recited in claim 1, wherein said integrated audio system is comprised of temperature sensor.

3. The integrated audio system as recited in claim 2 wherein said temperature sensor is connected to a shut-off relay.

4. The integrated audio system as recited in claim 1, wherein said integrated audio system is comprised of means for detecting the presence of direct current.

5. The integrated audio system as recited in claim 4, wherein said means for detecting the presence of direct current is connected to a shut-off relay.

6. The integrated audio system as recited in claim 1, wherein said signal processor is comprised of a low-pass filter, a high-pass filter, and a voltage amplifier.

7. The integrated audio system as recited in claim 1, wherein said power amplifier is comprised of a differential amplifier.

8. The integrated audio system as recited in claim 7, wherein said differential amplifier is connected to an inverting input from said signal attenuator.

9. The integrated audio system as recited in claim 8, wherein said differential amplifier is connected to a non-inverting input from said signal attenuator.

10. The integrated audio system as recited in claim 8, wherein said differential amplifier is connected to a voltage amplifier.

11. The integrated audio system as recited in claim 9, wherein said voltage amplifier is connected to a current amplifier.

12. The integrated audio system as recited in claim 11, wherein said current amplifier is connected to a current detector.

13. The integrated audio system as recited in claim 12, wherein said current detector is connected to said voltage amplifier.

14. The integrated audio system as recited in claim 13, wherein said current detector is comprised of means for providing a signal to said voltage amplifier whenever said current detector detects a current in excess of a specified amount.

* * * * *